June 9, 1964 K. HARTL 3,136,236
DIAPHRAGM ASSEMBLY
Filed May 1, 1961 3 Sheets-Sheet 1

June 9, 1964 K. HARTL 3,136,236
DIAPHRAGM ASSEMBLY
Filed May 1, 1961 3 Sheets-Sheet 2

June 9, 1964   K. HARTL   3,136,236
DIAPHRAGM ASSEMBLY
Filed May 1, 1961   3 Sheets-Sheet 3

United States Patent Office 3,136,236
Patented June 9, 1964

3,136,236
DIAPHRAGM ASSEMBLY
Karl Härtl, Munich, Germany, assignor to Compur-Werk Friedrich Deckel oHG, Munich, Germany, a firm of Germany
Filed May 1, 1961, Ser. No. 106,744
Claims priority, application Germany May 13, 1960
9 Claims. (Cl. 95—64)

This invention relates to a diaphragm assembly for photographic purposes, for use in a camera, a projector, an enlarger, or other places where an adjustable diaphragm or "stop" is useful.

An object of the invention is the provision of a generally improved and more satisfactory diaphragm assembly, particularly one in which the leaves or blades of the diaphragm can be adjusted to a position completely closing the aperture.

Another object is the provision of a diaphragm in which the leaves or blades are so arranged that they do not interfere with each other, in spite of the fact that they can be moved to a position completely closing the aperture, rather than merely reducing the aperture to a small size as in the customary conventional diaphragm.

A further object is the provision of a diaphragm of the kind adjustable to a completely closed position, so designed and constructed that friction is greatly reduced and that the leaves can be adjusted with great rapidity without fouling or interfering with each other.

These and other desirable objects may be attained in the manner disclosed as an illustrative embodiment of the invention in the following description and in the accompanying drawings forming a part hereof, in which.

Figure 1:
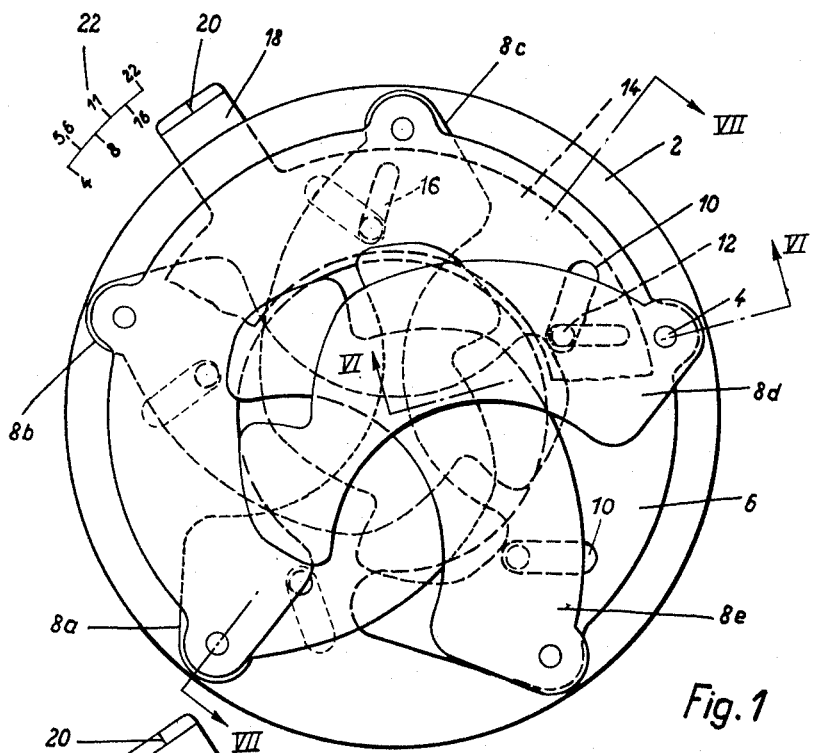
FIG. 1 is a front face view of a diaphragm assembly according to a preferred embodiment of the invention illustrating the diaphragm leaves in fully closed position, and showing schematically the diaphragm aperture scale.
Figure 3:
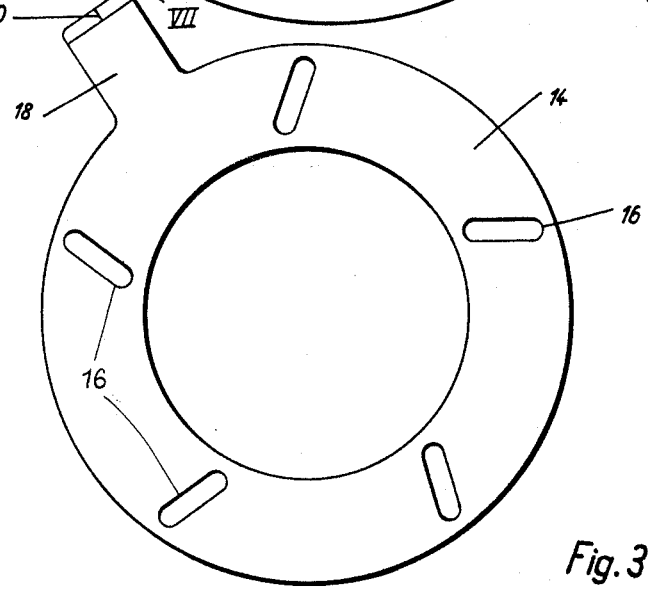
FIG. 3 is a face view of the diaphragm actuating ring.

Most photographic diaphragms of the conventional kind serve for adjusting the size of the light-transmitting aperture from maximum to minimum, but still leave an opening through which light may pass even when adjusted to the minimum size of aperture. In some cases, however, it is desirable to be able to close the diaphragm down to a completely closed position, allowing no light to pass through. Such complete-closing diaphragms are already known broadly, but in the previously known constructions the adjustable leaves or blades interfere with each other and cause undue friction, particularly during adjustment to small aperture position or completely closed position. Even in the prior constructions which are most satisfactory from the standpoint of controlling passage of light adequately, there is still the factor of undesirable frictional resistance to adjustment, making it difficult or impossible for such diaphragms to be adjusted automatically by the rather slight power derived from a photoelectric cell, and also difficult to adjust the diaphragm with the great rapidity required in certain designs of single lens reflex cameras. The present construction is designed to overcome these prior difficulties, and to provide a diaphragm assembly in which the leaves or blades do not interfere with or foul each other, and which has very low frictional resistance to adjustment, even in positions of relatively small aperture and completely closed aperture, and which permits very rapid movement of the leaves. Thus the present construction is suitable for use in a single lens reflex camera requiring fast movement, and suitable for automatic adjustment from the power of a photoelectric cell.

Referring now to the drawings, there is shown a stationary pivot ring or mounting ring 2 which carries the diaphragm assembly and which is secured in known manner in any suitable known position where the diaphragm is to be used, e.g., in the casing or housing of an objective shutter, or in the mount of an interchangeable lens or objective. The mounting ring 2 carries the pivot pins 4 which serve as mounting means or holding means for the stationary member 6 and also as pivots or fulcrums for the diaphragm leaves or blades 8, one being pivoted to each of the pins 4, so that the number of diaphragm leaves is equal to the number of pivot pins. In the construction shown as an example, there are five pivot pins 4, and five diaphragm leaves 8, which for convenience of further discussion are individually indicated consecutively as 8a, 8b, 8c, 8d, and 8e.

Figure 2:
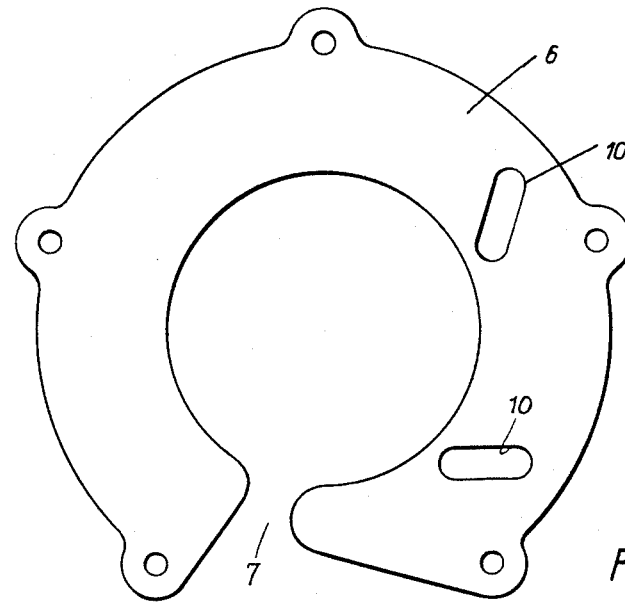
FIG. 2 is a face view of a partition member or separator forming part of the assembly.

The stationary member 6 has a preferred shape best shown in FIG. 2, and is approximately of ring form, as will be seen, but with a radial opening 7 through the ring at one point. It is of thin material, approximately the same thickness as that of the individual diaphragm leaves, and it may be variously referred to as a partition, or septum, or separator, or as a foil, since it is frequently convenient to make this member of a thin sheet which may be appropriately called a foil.

Figure 5:
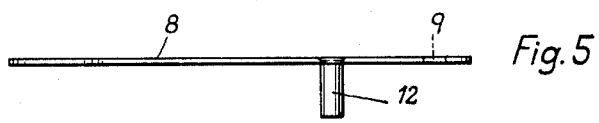
FIG. 5 is an edge view of the same.
Figure 4:
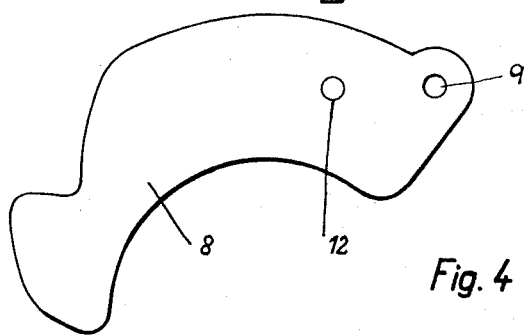
FIG. 4 is a front face view of one of the diaphragm leaves or blades.
Figure 6:
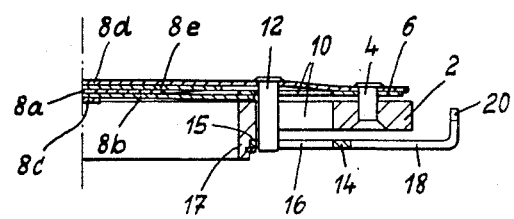
FIGURES 6 and 7 are section views taken along section lines VI—VI and VII—VII of FIGURE 1.
Figure 7:
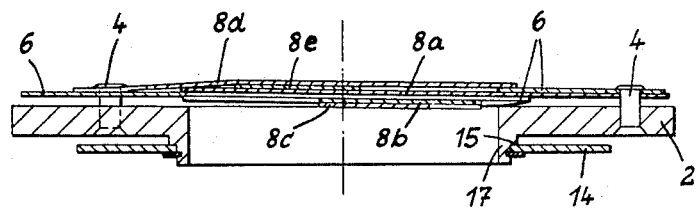

Each diaphragm leaf 8 preferably has the shape shown in FIGS. 4 and 5. At one end of each leaf is the circular opening 9 which fits snugly but rotatably on one of the pivot pins 4, and at a little distance from the pivot opening 9 is a pin 12 fixed securely to the leaf and extending perpendicular thereto, in a direction parallel to the optical axis of the assembly.

Both the mounting ring 2 and the foil or partition 6 are provided with slots 10 through which certain of the pins 12 extend. The pins 12 couple the diaphragm leaves 8 operatively with a diaphragm actuating ring 14 located behind the mounting ring 2. This actuating ring 14 is provided with cam slots 16 in which the pins 12 slidably engage. The actuating ring 14 is coaxial with the pivot ring or mounting ring 2, and may be rotatably mounted in any conventional known manner, such as being mounted on an annular shoulder or rabbet 15 formed on a cylindrical flange or projection 17 on the ring 2, or on a separate flange secured to the ring or forming part of the shutter casing or lens mount with which the diaphragm is used. The details of the way in which the actuating ring 14 is mounted for rotation are not important for purposes of the present invention, and hence are not shown.

A manipulating arm 18 extends radially outward from the actuating ring 14, and may carry at its outer end an index mark or reference point 20, read in conjunction with a scale indicated schematically or diagrammatically at 22, the scale preferably being graduated to show the aperture size according to the familiar f numbers. The aperture scale 22 is preferably marked circumferentially on a suitable portion of the barrel or mount of the shutter or objective with which the diaphragm is used.

The various slots 10 and 16 are so placed and so inclined with respect to the pins 12 that when the actuating ring 14 is turned in a clockwise direction (viewed as in FIG. 1) relative to the stationary mounting ring 2, the diaphragm leaves 8 will all be swung on their respective pivots 4 in a counterclockwise direction, to reduce the size of the diaphragm aperture, and if the clockwise movement of the actuating ring 14 is continued far enough, the diaphragm leaves will overlap each other at the center and completely close the aperture or light opening. Likewise if the actuating ring 14 is swung in a counterclockwise direction, the diaphragm leaves will be swung clockwise on their pivots and the diaphragm will open up to a larger aperture.

An important feature of the invention is the manner in which the diaphragm leaves are arranged or packed with respect to each other and with respect to the stationary partition or foil member 6. According to the invention, at least one of the leaves has both of its ends on one side or face of the partition member 6, and at least one of the other leaves has both of its ends on the opposite side or face of the partition member 6, and at least one other leaf has one end on one side of the partition member and its other end on the opposite side of the partition member.

In the specific embodiment here illustrated, the leaves or blades 8b and 8c have both their ends behind the partition member 6. In other words, they may be said to be sandwiched between the partition member 6 and the stationary mounting ring 2. On the other hand, the two leaves or blades 8d and 8e have both their ends located entirely in front of the partition member 6, lying on the opposite side or face thereof from that on which the leaves 8b and 8c lie. Thus the above described slots 10 are necessary in the partition member 6 in locations to receive the pins 12 of the leaves 8d and 8e, which must pass through the partition member 6 in order to reach the actuating ring 14. But no such slots are necessary in the partition member 6, for the pins 12 of the leaves 8b and 8c, because these two leaves lie wholly behind the partition member 6 and their respective pins 12 pass rearwardly from these leaves into the actuating ring 14 without having to pass through the partition member 6, although slots 10 in the mounting member 2 are needed for all of the pins 12 of all of the diaphragm leaves.

The other leaf 8a has its ends at opposite sides or faces of the partition member 6. The end of the leaf 8a which is pivoted on its respective pin 4 lies to the rear of the partition member 6, that is, between the partition member 6 and the actuating ring 14, so that for this leaf also it is not necessary to provide a slot 10 in the partition member 6. The intermediate part of this leaf 8a passes through the central opening and partially through the radial opening 7 in the partition member 6, and the free end of the leaf 8a lies in front of the partition member 6, that is, on the same side thereof as the previously mentioned leaves 8d and 8e.

Due to the presence of the partition member or foil member 6, and the manner in which the leaves are stacked or packed, in accordance with the present invention, the area of contact between the various leaves is greatly reduced, thus insuring that the leaves will swing smoothly with little risk of fouling each other. This of major importance of the diaphragm assembly is required to be set quickly within a very short time, as will be the case for example, in a single lens reflex camera, where the diaphragm leaves must move very quickly at the conclusion of the focusing or viewing step, before the exposure is made.

Especially in such a camera where the diaphragm leaves must make fast movements, it is particularly advantageous to make the partition member 6 of a material which, either by itself or after a suitable treatment, produces or engenders a minimum coefficient of friction between the partition member and the diaphragm leaves. Suitable materials for the manufacture of the partition member 6 are the thin sheet materials known as fluorethylenes which are available on the market under various trade names and which have a very low coefficient of friction when in contact with diaphragm leaves or blades of thin sheet steel, sheet aluminum, or other light metal. The very small effort required in setting or adjusting the diaphragm, when it is constructed according to the present invention with the low-friction materials mentioned, enables the diaphragm aperture to be automatically controlled quite easily, as for instance by the power of a photoelectric cell. Furthermore, the disposition of the leaves and of the partition member according to this invention permits the guided end of each individual leaf to be reduced in size with a resultant saving in space.

The ability of the diaphragm leaves to close down to a completely closed position, without interference and without undue friction, makes this diaphragm particularly suitable for the above mentioned use in a single lens reflex camera, as will be understood by those skilled in the art.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic diagram assembly of the complete closing type, comprising a series of at least three pivoted leaves mounted for swinging movement from a position providing maximum aperture to a completely closed position, characterized by the provision of an intermediate partition member and by the fact that at least one of said leaves has both its ends lying on one side of said partition member, at least one other of said leaves has both its ends lying on the opposite side of said partition member, and at least one other of said leaves has one of its ends lying on one side of said partition member and the other of its ends lying on the opposite side of said partition member, and further characterized by the fact that when said leaves are swung to a completely closed position, the effective aperture-defining edges of all of said leaves swing substantially beyond the central axis of the aperture so that all of said leaves overlap each other at the central axis and extend across the central axis.

2. A construction as defined in claim 1, in which said partition member is of generally ring shaped form with a central opening through which light may pass when said leaves are adjusted to an open aperture and with a generally radial opening through which said last named one of said leaves may extend to enable one end thereof to be on one side of said partition member while the other end thereof is on the other side of said partition member.

3. A construction as defined in claim 2, in which said leaves are made of metal and said partition member is formed at least in part of a fluorethylene.

4. A construction as defined in claim 2, in which said partition member is in sliding contact with at least some of said leaves and is formed of material having a relatively low coefficient of sliding friction with respect to the material of which said leaves are made.

5. A construction as defined in claim 1, in which said leaves are made of metal and said partition member is formed of a fluorethylene.

6. A construction as defined in claim 1, in which said partition member is in sliding contact with at least some of said leaves and is formed of material having a relatively low coefficient of sliding friction with respect to the material of which said leaves are made.

7. A photographic diaphragm assembly comprising a mounting ring substantially coaxial with an optical axis of the assembly, a separator member extending approximately perpendicular to said optical axis, said separator member having a central opening alined with said optical axis for passage of light therealong and having a notch extending laterally from said central opening, two elongated adjustable diaphragm leaves pivotally mounted on said mounting ring near one end of each of said leaves, both ends of both of said leaves lying in front of said separator member, another two elongated adjustable diaphragm leaves also pivotally mounted on said mounting ring near one end of each of such leaves, both ends of both of said other two leaves lying behind said separator member, and a fifth elongated adjustable diaphragm leaf also pivotally mounted on said mounting ring near one end of said fifth leaf, one end of said fifth leaf lying in front of said separator member and the other end of said fifth leaf lying behind said separator member, an intermediate portion of said fifth leaf passing through said notch in said separator member, said separator member serving to separate certain of said diaphragm leaves from each other sufficiently to prevent fouling each other especially during high speed movement at relatively small aperture, the pivots of said diaphragm leaves being so arranged that as said leaves swing toward fully closed position, the inner edges of all of said leaves will swing across and beyond said optical axis to insure complete closing of the aperture even against intense light.

8. A construction as defined in claim 7, in which said separator member is made at least partly of material having a relatively low coefficient of sliding friction with respect to the material of which said diaphragm leaves are made.

9. A construction as defined in claim 8, in which said diaphragm leaves are made of metal and said separator member is made of a fluorethylene.

References Cited in the file of this patent
UNITED STATES PATENTS

| | | |
|---|---|---|
| 1,598,022 | Snyder et al. | Aug. 31, 1926 |
| 2,297,262 | Tonnies | Sept. 29, 1942 |
| 2,944,477 | Tesch | July 12, 1960 |
| 2,988,977 | Rentschler | June 30, 1961 |